United States Patent [19]

Ratovelomanana et al.

[11] Patent Number: 5,134,681
[45] Date of Patent: Jul. 28, 1992

[54] INTEGRATED OPTIC WAVEGUIDE AND FABRICATION METHOD

[75] Inventors: Frédéric Ratovelomanana, Viry Chatillon; Yannic Bourbin, Chatenay Malabry; Michel Papuchon, Massy, all of France

[73] Assignee: Thomson-CSF, Puteaux, France

[21] Appl. No.: 652,668

[22] Filed: Feb. 8, 1991

[30] Foreign Application Priority Data

Feb. 13, 1990 [FR] France ................. 90 01668

[51] Int. Cl.$^5$ .............................................. G02B 6/10
[52] U.S. Cl. ..................................... 385/130; 385/129
[58] Field of Search ............... 350/96.12, 96.10, 96.11, 350/96.15; 385/129, 130, 131, 132

[56] References Cited

U.S. PATENT DOCUMENTS

| | | | |
|---|---|---|---|
| 4,838,638 | 6/1989 | Kamiyama et al. | 350/96.12 X |
| 4,846,541 | 7/1989 | Miura et al. | 350/96.12 |
| 4,864,516 | 9/1989 | Baken | 350/96.12 X |
| 4,871,221 | 10/1989 | Imoto | 350/96.12 |
| 4,889,401 | 12/1989 | Klement et al. | 350/96.12 |
| 4,901,321 | 2/1990 | Blondeau et al. | 350/96.12 X |
| 4,952,015 | 8/1990 | Van Ruyven | 350/96.12 |
| 4,952,016 | 8/1990 | Adams et al. | 350/96.12 |

OTHER PUBLICATIONS

Proceedings of The Fourth European Conference On Integrated Optics ECIO 87 May 11-13, 1987, pp. 82-85, Glasgow, Scotland, GB; Y. Bourbin et al.: "A new waveguide structure in InGaAsP/InP material".

Applied Physics Letters vol. 52, No. 13, Mar. 28, 1988, pp. 1031-1033; J. I. Thackara et al.: "Poled electro-optic waveguide formation in thin-film organic media".

Proceedings of the 15th European Conference on Optical Communiation vol. 1, Sep. 1989, pp. 425-428, Gothenburg, SE; M. B. J. Diemeer et al.: "Polymeric channel waveguide modulators".

*Primary Examiner*—John D. Lee
*Assistant Examiner*—Phan T. Heartney
*Attorney, Agent, or Firm*—Oblon, Spivak, McClelland, Maier & Neustadt

[57] ABSTRACT

An optic waveguide includes a buffer layer with an index n1, a strip with a high index n2 and a guiding layer with an index n3. The refraction indices correspond to the relationship: n2>n3>n1. The thickness of the strip is chosen to be very small so as to induce no optic losses. The device can be applied to the making of optic and electrooptical components.

12 Claims, 4 Drawing Sheets

PRIOR ART
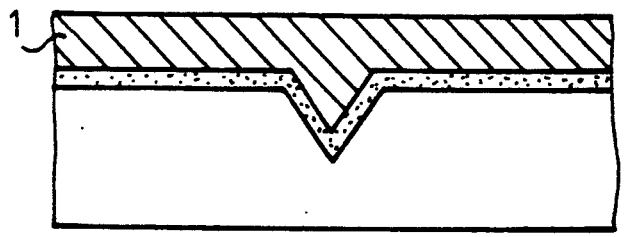
FIG_1
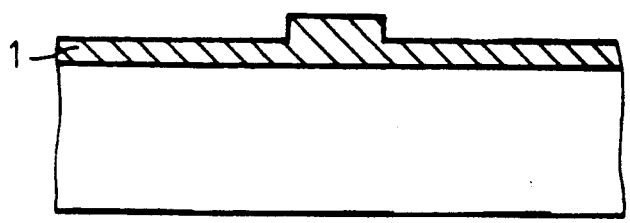
FIG_2
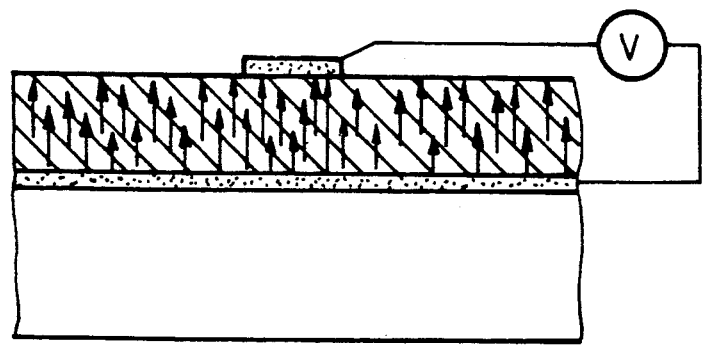
FIG_3
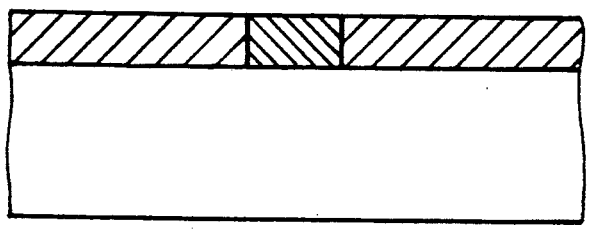
FIG_4
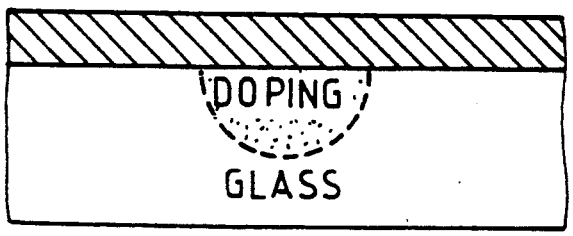
FIG_5

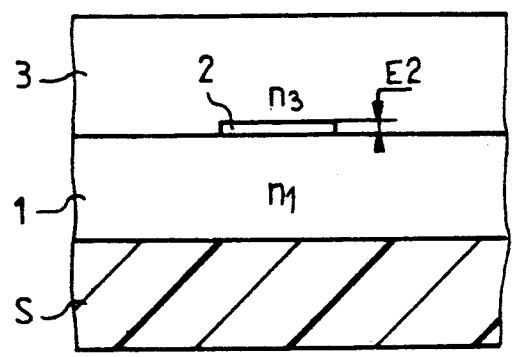
FIG_6
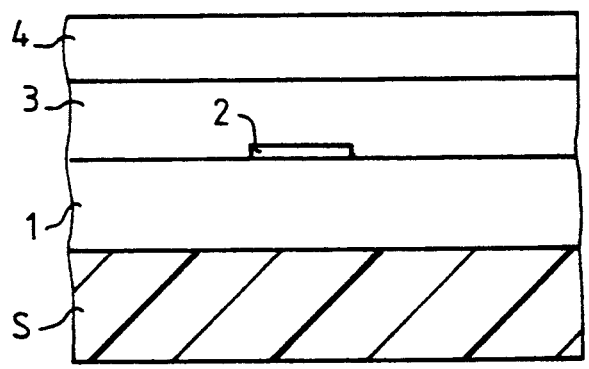
FIG_7
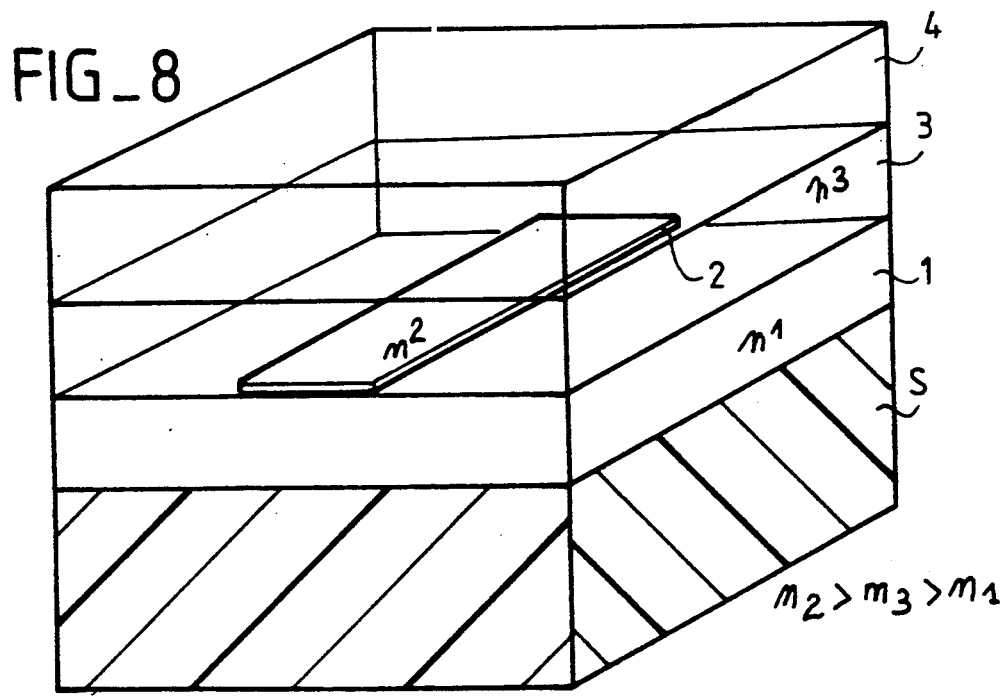
FIG_8

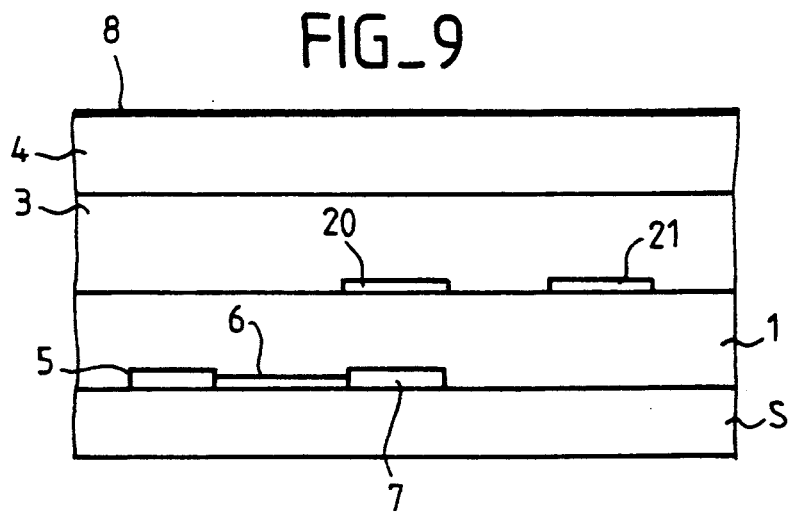
FIG_9
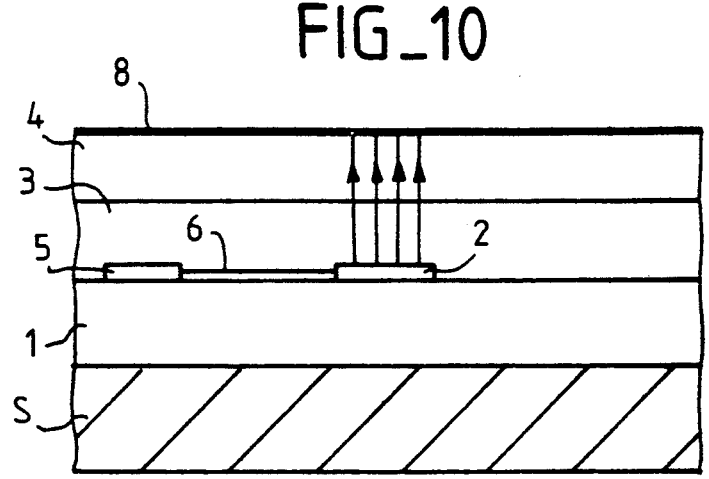
FIG_10
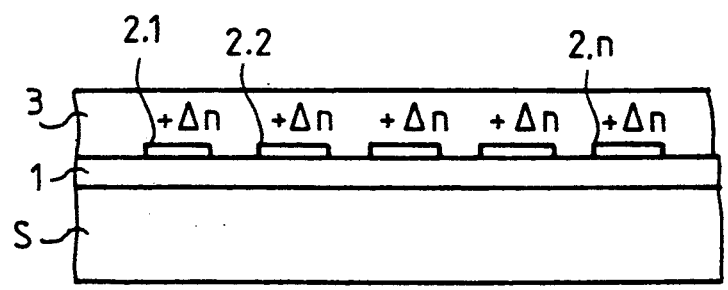
FIG_11

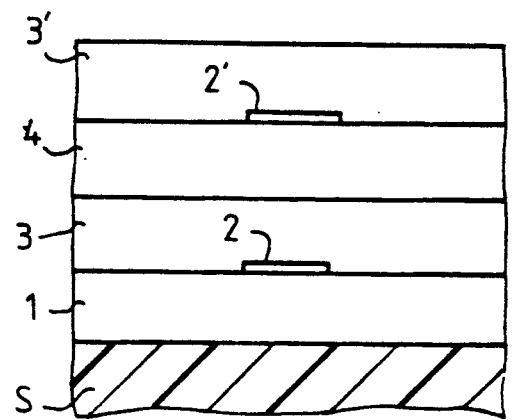
FIG_12
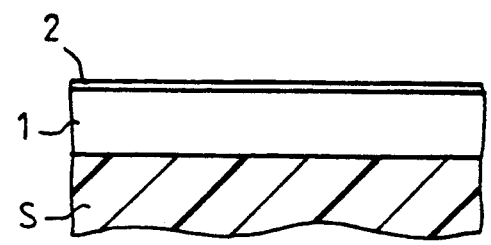
FIG_13
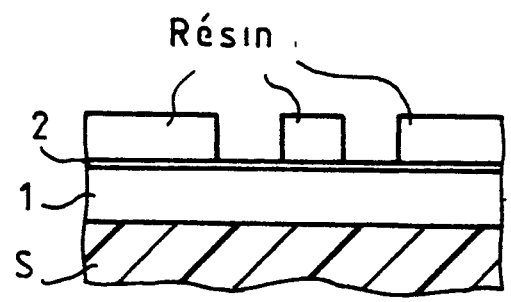
FIG_14

INTEGRATED OPTIC WAVEGUIDE AND FABRICATION METHOD

BACKGROUND OF THE INVENTION

1. Field of the Invention

The invention relates to an integrated optic waveguide and to the method for making it. In particular, it relates to a structure in which the waveguide is buried.

In the past few years, new organic materials with promising electronic properties have been developed. There are two distinct aspects to research and design work on to these materials: these are the designing of the material (improvement of the physical characteristics, chemical synthesis, etc.) and the designing of the optoelectronic components that use these materials.

The object of the invention lies within the context of the latter aspect. Making optoelectronic components that use these new materials means that it is necessary, first of all, to design the architecture of the component, and secondly to devise and perfect the entire technological process needed for the effective fabrication of the component.

The object of the invention, therefore, relates to electronic components using electrooptical organic polymers. The electrooptical organic materials used in the making of these components are optically non-linear materials. This optic non-linearity is generally capable of being used only after the materials have been deposited as thin films (by spin-coating as in microelectronics) and polarized under an electrical field. It is thus possible to make small-sized phase or intensity modulators having good optical characteristics.

However, the one-dimensional confinement of the light is not sufficient. The making of an optoelectronic component dicates a search for two-dimensional confinement. The mastering of this technology will lead to a new generation of very low-cost integrated optoelectronic components: phase or intensity modulators, electrooptical switches for telecommunications by optic fibers, frequency doublers (to obtain, for example, green or blue radiation) for the storage or reading of data.

2. Description of the Prior Art

A number of approaches have been developed, enabling two-dimensional confinement to be achieved.

A first approach shown in FIG. 1 consists in locally increasing the effective index encountered by the light by locally increasing the thickness of the polymer. However, it is extremely difficult to keep to the dimensions dictated by the architecture of the component, both transversally and in depth. Furthermore, although FIG. 1 shows a perfect planarization of the polymer, this is rarely the case owing to the depth of the etching.

A second approach, shown in FIG. 2, provides for a direct dry or chemical etching of the polymer 1 which raises the problem of the etching mask and the quality of the result obtained.

A third approach, shown in FIG. 3, provides for the deposition of a metal electrode on the polymer and then for the etching of this electrode. This raises problems of selectivity of etching and of possible chemical damage to the polymer.

A fourth approach, shown in FIG. 4, provides for confinement by local modification of the nature of the material, which can be done by UV insolation through a mask. This raises a problem of diffraction and of the creation of an index gradient by uncontrollable UV radiation.

Finally, a fifth approach shown in FIG. 5 provides for a modification of the assymmetry of a planar guide by local doping of a glass substrate. This approach raises a problem of the polishing of the guide input and output faces.

SUMMARY OF THE INVENTION

The invention concerns a two-dimensional monomode guide meeting the following conditions:
- it is easy to prepare the input and output faces for efficient coupling of light coming from an optic fiber.
- the guide is not limited, in dimensions, by the technological process: it is possible to make micronic guides (1 to 2 $\mu$m) or submicronic guides (0.5 to 1.0 $\mu$m).
- the propagation losses are diminished.
- a batch fabrication technology is developed for the low-cost production of the components.

The invention therefore relates to an integrated optic waveguide including the following on a substrate:
- a buffer layer with a first index of refraction;
- a strip-shaped element with a second index of refraction;
- a guiding layer made of a material with a third index of refraction; said guide further having the following characteristics:
- the second index of refraction is greater than the third index which is greater than the first index;
- the thickness of the strip is chosen to be very low so as to induce no optic losses but so as to obtain a confinement of light owing to its high refraction index.

The invention also concerns a method for making an optic guide according to claim 1, comprising the following successive steps:
- a first step for the making, on a buffer layer with a first index, of a layer of a material with a second index higher than the first index;
- a second step for the etching, in this layer with a second index, of at least one strip;
- a third step for the deposition, on the strip and on part of the buffer layer not covered by the strip, of a guiding layer made of a material with a third refraction index that is smaller than the second refraction index.

According to a preferred embodiment of the invention, the guiding layer may be made of a polymer material.

The optic guide according to the invention thus makes it possible to confine the light along strips with an index that is appreciably higher than the index of the polymer guiding layer. It can thus be made according to batch production techniques used in microelectronics, thus enabling the cost of the component to be reduced.

In this way, the invention enables the following solutions to problem:
- low cost: it provides for the fabrication of waveguides in batches on a silicon substrate;
- the preparation of the input and output faces of the guide: there is provision for a cleaving of the component;
- control over the variation in effective index: the thickness of the strip with high index is adjusted;
- reduction in the losses and dimensions of the guide: the strip is made by selective plasma attack (reactive ion etching), thus enabling the making of micronic (1 to 2 μm) or submicronic (0.5 to 1 μm) guides.

Furthermore, the device and the method of the invention are limited neither by the fragility nor by the nature of the polymer used for the guiding layer.

BRIEF DESCRIPTION OF THE DRAWINGS

The various objects and characteristics of the invention will appear in the following description, as well as in the appended figures, of which:

FIGS. 1 to 5, described here above, show prior art techniques;

FIG. 6 exemplifies an embodiment of an optic guide according to the invention;

FIG. 7 shows an alternative embodiment of the optic guide according to the invention;

FIG. 8 shows a view, in perspective, of the device according to the invention;

FIG. 9 exemplifies an embodiment of the device of the invention, including electrodes to apply an electrical field;

FIG. 10 shows an alternative embodiment of the device of FIG. 9;

FIG. 11 exemplifies an embodiment of a phase array obtained by placing an array of strips with a high index perpendicularly to an optic guide;

FIG. 12 exemplifies an embodiment of the device of the invention including several integrated optic guides;

FIGS. 13 and 14 show steps illustrating the fabrication method according to the invention.

DETAILED DESCRIPTION OF THE INVENTION

Referring to FIG. 6, we shall now describe an exemplary embodiment of an optic guide according to the invention. An optic guide such as this has a buffer layer 1, with a refraction index n1, on a substrate S. On this layer 1, there is an element in the form, for example, of a strip 2 made of a material with an index n2. The entire unit is covered with an optic guiding layer with a refraction index n3.

The refraction index n2 of the strip 2 is greater than the refraction index n1 of the layer 1 and the refraction index n3 of the layer 3.

$$n2 > n3 \quad n2 > n1.$$

The materials used for the layers 1 and 3 and the strip 2 are transparent to the wavelength of the optic guide and notably the strip 2 and the layer 3.

The object of the strip 2, with a high index n2, inserted between the two layers 1 and 3 with lower indices, is to obtain a two-dimensional confinement of the wave to be transmitted in the guide.

The index n2 of the strip 2 should be high enough for the confinement to be obtained by means of a very small strip thickness. For example, the thickness of the strip 2 will be some tens of nanometers.

In this way:

The light can be confined chiefly in the layer with an index n=greater than (n2, n3) and to adjust the shape of the electrical field of the optic wave in this layer by acting on its thickness, n2 being given.

Owing to the small thickness of the strip with an index n2, this strip can be considered to be only a disturbance in the confinement of light: it can therefore be stated that the strip with an index n2 has but very little influence on the losses of the guide.

According to the invention, it is also provided that the index n3 will be greater than the index n1 in such a way that the guiding is done in the layer 3.

According to a preferred exemplary embodiment of the invention, the materials used are:
substrate S = silicon and, notably, crystalline silicon;
buffer layer 1 = thermal silica;
strip 2 = amorphous silicon or ITO (indium-tin-oxide) or $Si_3N_4$;

guiding layer 3: polymer.

The polymer of the guiding layer 3 may be an electrooptical or non-electrooptical polymer.

The device of FIG. 6 can work in the ambient air. In its upper part, therefore, the guiding layer 3 is in a medium with an index n4 = 1.

FIG. 7 shows an exemplary embodiment in which the guiding layer is covered with a buffer layer 4 with an index n4 (superstrate).

FIG. 8 shows a view in perspective of the device of the invention where it is seen that the element 2 may have the form of a strip.

A structure such as this was made on a silicon substrate with:
a buffer layer 1 of silica, with a 3 μm thickness, the index n1 of which is 1.45 at a wavelength λ = 1.3 μm.
a strip 2 made of amorphous silicon with a 30 nm thickness and an index n2 = 3.8 for λ = 1.3 μm,
a guiding layer 3 (with a 0.7 μm thickness) made of polymer with an index n3 = 1.6 for λ = 1.3 μm.

The guiding layer 3 was in contact with the air (n4 = 1 at its upper part).

The effective indices of the polarized dominant TE or TM modes of a guide such as this are:

$n_{TE} = 1.75$ $n_{TM} = 1.52$ similar structure was made with a strip 2 made of silicon nitride (instead of amorphous silicon) with an index $n_2 = 1.8$ at λ = 1.3 μm. With an 80 nm thickness of the strip 2, the following effective indices were obtained:

$n_{TE} = 1.56$ $n_{TM} = 1.55$

The device of the invention makes it possible to obtain a variation in effective index on the guiding layer 3 by the choice of thickness of the strip 2.

Furthermore, it enables the shape of the field in the guiding layer 3 to be adjusted, in providing for a refraction index n2 of the strip that is greater than the indices n1 and n3 and in adjusting the thickness of the strip 2 so that it has a sufficiently small value.

In this way, the strip 2 can be used to obtain efficient optic guiding without introducing losses.

The optic guiding according to the invention can be set up in the form of a modulator.

FIG. 9 shows a modulator such as this having microelectronic control circuits 5 integrated on a substrate S made of a semiconductor material (such as GaAs, InP, Silicon). The circuits 5 are connected by conductors 6 to a control electrode 7, also made on the substrate.

The entire unit is covered with a waveguide structure including a buffer layer 1 (made of silica for example), one or more strips 20, 21, at least one of which is positioned above the electrode 7, a guiding layer made of electrooptical polymer 3, a buffer layer 4. On its upper face, the buffer layer has an electrode 8. Means not shown, connectable to the electrodes, thus enable an electrical field to be applied to the structure.

The structure of FIG. 9 can thus work as a directional coupler to couple the light of a guide (guide formed by the strip 20) into the other guide (guide formed by the strip 21).

A guide such as this can also be laid out in the form of a:
- modulator,
- electrooptical switch with two inputs and two outputs;
- frequency doubler.

FIG. 10 shows a device in which the strip 2 is used also as an electrode to apply an electrical field to the waveguide. In this case, the electronic control circuits 5 and the conductors 6 for connection to the strip 2 are made on the buffer layer 1.

The strip 2 (made of amorphous silicon or indium-tin-oxide ITO, for example) makes it possible the confine the light but also to apply an electrical field of modulation to the electrooptical material of the layer 3. This structure makes it possible to improve the efficiency of the electrical field applied and in the case, for example, of a modulator, to improve the efficiency of the modulation.

The invention can also be applied to the making of integrated optic arrays such as are shown in FIG. 11.

To this end, a phase array is made above a two-dimensional guide or a plane guide. This phase array is obtained by a set of strips (2.1, 2.2 ... 2.n) with a high index. By the fabrication techniques used for the etching of the strips 2.1 to 2.n, the width of the strips and their spacing may be very small. Thus, an array is obtained with an index enabling the spatial modulation of an optic guide. In this embodiment, the guiding can be done in the plane, or it may be linear guiding.

According to the invention, there is also provision, as shown in FIG. 12, for an optic guide structure with a vertical integration.

On the polymer layer 3, there is another buffer layer 4 on which there is another strip 2' covered with another guiding layer 3'.

The entire unit may be covered with another identical structure, and so on and so forth.

The method for making the optic waveguide according to the invention shall now be described with reference to FIGS. 13 and 14. The substrate used is, for example, silicon.

In a first step, the face SO of the substrate S is cleaned. Then a layer of thermal silica is grown by thermal oxidation. Thus, the buffer layer 1 is obtained on the substrate S.

The process of growing $SiO_2$ on silicon is done in an oxidation furnace.

For example, the following may be the operating conditions:
 temperature of the furnace: 1100° C.
 oxidation gas: de-ionized steam
 duration of first oxidation: about 7 hours
 annealing of first deposit: about 12 hours under nitrogen
 duration of second oxidation: about 7 hours
 annealing of second deposit: about 2 hours under nitrogen This operation should imperatively be carried out continuously. The wafers should not leave the furnace during this oxidation.

It must be noted that the speed of growth of the silica film on the silicon substrate depends on the orientation of the silicon wafer.

With non-doped Si (100), a value of three microns is achieved with difficulty.

With doped Si (110), at the end of 7 hours, we have already 2.5 μm and, at the end of 14 hours, 3.0 μm of excellent quality $SiO_2$ are obtained.

The annealing of the deposits under nitrogen is designed to expand the material and to localize the energy of the material in the grain boundaries, and to improve the microelectronic and optic qualities of the material.

At the end of the second step, a thin layer of a material with a high refraction index n2 is obtained. Thus, a structure such as the one shown in FIG. 13 is obtained.

The material used should fulfil several conditions:
- it should have an index that is appreciably greater than that of the polymer or of the silica;
- it should be capable of being deposited in ultra-thin layers with precision;
- it should be transparent to the operating wavelength;
- in the case of a modulator: it should be capable of acting as an electrode and, hence, of having good electrical qualities (low resistivity, etc.).

These characteristics lead to the use of silicon nitride ($Si_3N_4$) or amorphous silicon.

The technique used for the deposition of this material could be, for example, of the PECVD (plasma enhanced chemical vapor deposition) type. Deposition by LPCVD (low pressure chemical vapor deposition) could also be considered. The thickness of a layer of some tens of nanometers (20 nm for example) may be controlled to within 4%.

During a third step, the strip is etched in the layer thus deposited during the second step. This etching can be done by selective chemical attack through a mask obtained by photolithography.

This photolithography is a decisive step in this fabrication method. It is this step that will fix the lateral roughness of the strips.

The structure obtained after the second step, bearing a silicon or nitride layer, is immediately resin-coated to be protected.

Then, the protective resin layer is removed in a primary acetone bath and then in a secondary bath of cold propanol to remove the traces of acetone.

The residual propanol is removed by nitrogen blowing or by keeping the deposit under heat for one hour or half an hour at 150°.

Then, a photosensitive resin is deposited, and then insolation is performed by means of UV radiation through a mask placed as close as possible to the photosensitive resin. After development of the resin and image, a structure such as the one shown in FIG. 14 is obtained. The strip is then etched by selective chemical attack, for example a chemical attack assisted by an ion bombardment (by reactive ion etching or RIE). Finally, the resin mask is removed.

During a fourth step, a polymer layer 3 and, possibly, another buffer layer 4 are deposited, by spin-coating for example. The structure of the invention shown in FIG. 6 is then obtained.

The method of the invention therefore enables a three-dimensional confinement in optoelectronic components, using electrooptical, organic materials.

Up till now, the approaches proposed consist, for example, in locally increasing the thickness of the polymer layer (by an etching of the polymer or of the substrate) or in locally modifying the intimate structure of the material by UV insolation. In both instances, we come up against problems of dimensions (the guides in the state of the art have a minimum width of 5 μm) or of control over the variation in effective index (index gradient for guides made by UV insolation) but, above all, problems of definition of the edges of guides (a preponderant problem in the direct etching of the polymer).

The approach proposed can be satisfactory from all points of view:

a) —transversal reductions in the dimensions of the guide: technologically, this method of designing the guides with organic materials comes under the usual technologies of microelectronics.

With RIE, it is possible to make 200 nm guides. It is possible to envisage dimensions that are smaller than this, with electronic lithography.

b) —sharpness of the guide made: quality of the definition.

c) —RIE reproduces the resin mask: this gives a good-quality guide d) —checking of the effective index variation: in effect, the effective index is a function of three parameters, namely: the thickness of the zone with a high index, the thickness of the polymer layer, and the value of the highest index.

Finally, it may be noted that this method of confinement avoids disturbing the polymer layer.

The invention can be applied to the making of:

wideband organic modulators (phase or intensity modulators), frequency doublers, integrated devices with several levels, components with several levels, optic interconnections, optic switches with two inputs and two outputs.

What is claimed is:

1. An optic waveguide comprising:
a substrate;
a buffer layer formed on said substrate and having a first index of refraction;
a strip-shaped element formed on said buffer layer and having a second index of refraction;
a guiding layer formed on part of the buffer layer not covered by said strip-shaped element and formed of a material having a third index of refraction;
wherein said second index of refraction is greater than said third index of refraction, and said third index of refraction is greater than said first index of refraction, and a thickness of said strip-shaped element is chosen to be very low so as to induce no optic losses while obtaining a confinement of light because of its high refraction index.

2. The optic waveguide according to claim 1, wherein said guiding layer comprises an electrooptical material and wherein the thickness of the strip is chosen so as to adjust the shape of the electrical field in the guiding layer.

3. The optic waveguide according to claim 1, wherein the guiding layer comprises a polymer material.

4. The optic waveguide according to claim 1, further comprising a first electrode located on said guiding layer above said strip-shaped element, and a second electrode located on the substrate side with respect to the guiding layer, said electrodes enabling the application of an electric field.

5. The optic waveguide according to claim 4, wherein said strip is made of an electricity conducting material and constitutes said second electrode.

6. The optic waveguide according to claim 1, wherein said buffer layer is made of thermal silica and wherein said strip is made of amorphous silicon or indium tin oxide.

7. The optic waveguide according to claim 1, wherein said strip is made of silicon nitride.

8. The optic waveguide according to claim 1, further comprising a buffer layer covering said guiding layer and having a fourth index of refraction that is smaller than said third index of refraction.

9. The optic waveguide according to claim 1, further comprising several strip-shaped elements formed on said buffer layer having a first index of refraction which produce an array designed to spatially modulate the phase of an optic wave.

10. The optic waveguide according to claim 1, further comprising at least another buffer layer covering said guiding layer on which there is located at least another strip-shaped element covered with at least another guiding layer.

11. A method for forming an optic waveguide comprising the steps of:
forming a substrate layer;
forming on said substrate layer a buffer layer having a first index of refraction;
forming on said buffer layer a layer of material having a second index of refraction higher than said first index;
etching in said layer of material having a second index of refraction at least one strip; and
depositing on said at least one strip and on a part of said buffer layer not covered by said at least one strip a guiding layer comprising a material having a third index of refraction that is smaller than said second index of refraction.

12. The method of forming an optic waveguide according to claim 11, wherein said deposited material comprising said guiding layer is a polymer material.

* * * * *